Feb. 6, 1951      J. L. BARKER      2,540,089

VEHICLE DETECTOR

Filed May 17, 1944      2 Sheets-Sheet 1

INVENTOR
JOHN L. BARKER
BY Edward H. Eames
ATTORNEY

INVENTOR
JOHN L. BARKER

UNITED STATES PATENT OFFICE 2,540,089

VEHICLE DETECTOR

John L. Barker, Norwalk, Conn., assignor, by mesne assignments, to Eastern Industries, Incorporated, a corporation of Delaware Application May 17, 1944, Serial No. 535,937

12 Claims. (Cl. 343—14)

This invention relates generally to a detector for traffic vehicles passing a particular point or zone in a traffic lane, at or within a predetermined distance from a traffic control station or traffic reporting station. Such vehicles may be of the automotive type for example in a roadway or railway vehicles on a railroad track.

As a first example of the invention, however, it will be considered in relation to automotive vehicles in a roadway.

The invention relates more particularly to a remote vehicle detector employing ultra high frequency or hyper-frequency electro-magnetic or radio waves transmitted from a control point or control station in or over or along a road, and identifying the approach of a vehicle at the desired detection distance by reflection of a part of the waves back to a receiver at or near the control point, and comparing the transmitted and reflected waves to identify the maximum time spacing between the transmitted and reflected waves corresponding to the desired detection distance.

In the preferred embodiment of the invention hyper-frequency transmitted waves are frequency modulated and combined with the reflected waves to provide a beat frequency in the audio frequency to super-audio frequency range which is then readily amplified and passed through frequency selective circuits to obtain an output responsive only to a beat frequency or beat frequency range corresponding to the desired vehicle detection distance in the traffic lane.

Vehicles containing electrical conducting surfaces serve to reflect a large part of ultra high frequency and hyper-frequency radio waves of the order of 500 megacycles to 15,000 megacycles frequency for example, and objects having a specific inductive capacity differing considerably from air will also reflect a considerable portion of such waves, particularly in the highest frequency, so that other traffic objects may be detected if desired.

Ultra high frequency and hyper-frequency radio waves have quasi-optical characteristics of behavior and can be directed by suitable reflectors or wave guides into a relatively narrow beam along a traffic lane. For example, the wave beam may be directed along one side of a roadway so as to be reflected back toward the source to a substantial extent only by one or more vehicles approaching on that one side of the roadway. Similarly the reflected waves received by a receiver near the source can be limited to a narrow beam or angle so as to substantially eliminate any detection of vehicles on the other side of the same road, such as vehicles moving away from the transmitter and receiver control point.

It will be appreciated that the transmitter and receiver may be combined as to some common parts for example in a single housing or may be separated some distance as desired to detect at the control point. The term control point is used in the general sense of a control station or location and is not limited to a finely located point on the roadway.

The invention has numerous applications as will be apparent but serves particularly well to operate a traffic signal or traffic counter or traffic signal controller in response to the approach of a vehicle along the traffic path at a desired distance from the signal or controller or within a zone of approach, or in some paricular cases within a zone of departure if desired, from the traffic signal.

Traffic actuated traffic signal systems which accord right of way at intersections to one road and withhold right of way from an intersecting road in response to traffic approaching on the first road are already well known and numerous types of more complicated traffic actuated signal control systems are known in the art.

Such systems have in the past employed enclosed pressure operated switches in the roadway or a magnetic detector coil in or near the road or a light beam across the road to detect the passage of traffic vehicles past the point of location of such detector. In most cases for traffic signaling purposes it is necessary to locate such detectors at a distance of 100 to 300 feet from the traffic signal or intersection in order to control relatively high speed traffic effectively, or in order to obtain information of approaching traffic enough time ahead of its arrival at the intersection to balance the control of right of way properly and allow time for a signal change on the intersecting street. This has required extensive installations of wire or cables from the signal control point to the point in the roadway where the traffic is to be detected. This is not only a source of expense to the public traffic authority but often involves cutting into pavements in the roadway and sidewalks and interfering with the sealing of the road from weather and traffic damage.

The use of such cable connected traffic detectors also involves difficulty in maintenance and repair where access to the buried or inset detector unit or its cables partially blocks traffic and involves at times the opening of the ground in very wet weather or in cold weather when the ground is frozen. Working on such detector devices in the roadway involves danger of personal injury and property damage from accident.

The present invention provides a means of detecting the approach of traffic remotely at a desired distance without the need of any roadway embedded detecting equipment or any connections at a distance from the control point. At a cross type intersection of two roads for example the present invention eliminates the four detectors and connecting wires that would formerly have been required 100 feet or more from the intersection on the several sides of the intersection.

The present invention also makes possible the effective detection of traffic approaching within and throughout a given distance from the intersection. An approaching vehicle may be detected while it is moving substantially all the way to the intersection starting at a distance of 200 feet from the intersection, for example. In traffic actuated signal practice it is desirable to detect vehicles at a considerable distance such as 150 to 200 feet from the intersection, but if a single vehicle detector element is used as in the past at such distance then driveways and alleys entering the roadway between the detector and the intersections are left without detection. Thus it is often necessary to install multiple detector units at greatly increased cost and at some loss in efficiency or it is necessary to set the single detector unit nearer the intersection at some sacrifice in best road traffic control to provide detection for the driveway or alley.

Various systems have been proposed in the past to check vehicles in and out of a traffic control zone or approach zone for very close control of right of way between the intersecting roads or within control zones in a traffic tunnel but the variability of traffic vehicle types and traffic movements is so great that check in and out systems depending upon checking or counting individual vehicles in and out at two detecting points have not proven satisfactory for automobile traffic in the past. The present invention makes it possible to detect the traffic in the approach or control zone from the maximum distance and while it travels substantially to the intersection and thus to hold the right of way for such vehicle or traffic for example until it reaches the intersection. This cares for vehicles driven into the traffic lane near the intersection from parking spaces along the edge of the road for example, as well as entering from driveways.

This is an important feature of the invention which solves a long standing problem in the traffic actuated traffic control field in providing for detection of vehicles close to the intersection and at intermediate distances as well as at the maximum desired distance.

A traffic detector in accordance with the invention may be applied to an isolated detection zone along a roadway or traffic lane independent of any traffic intersection, or it may be applied to an intersection of roadways or traffic lanes. For simplicity application of the invention is discussed here in detail more particularly to an individual traffic lane and it will be understood that this traffic lane could be isolated or that it could be one of several approaches to an intersection of traffic lanes where right of way traffic control signals may be employed.

Thus it is an object of the invention to provide a functionally and structurally improved means for remotely detecting vehicles on a traffic lane at a desired predetermined distance or within a desired predetermined distance.

It is an other object of the invention to provide an ultra high frequency or hyper-frequency radio device to detect traffic vehicles in a traffic lane at a distance from a traffic control point by directing a beam of ultra high frequency or hyper-frequency waves along the traffic lane from such point and receiving back at the control point the waves reflected from such vehicles, by measuring the time interval between the transmitted and received waves and identifying the waves from the vehicles within the desired distance by the time interval being less than a predetermined value.

It is an other object of the invention to provide an ultra high frequency or hyper-frequency radio device to detect traffic vehicles in a traffic lane at a distance from a traffic control point by transmitting ultra high frequency or hyper-frequency waves modulated as to frequency and beating the transmitted and reflected waves to obtain a frequency-difference representative of the distance to the wave reflecting vehicle, and using a frequency selective device or predetermined frequency responsive device to give an indication of the presence of the vehicle at or within a desired predetermined distance.

It is another object of the invention to provide an ultra high frequency or hyper-frequency radio device to detect traffic vehicles in a traffic lane at a distance from a traffic control point by obtaining a frequency-difference as in the last paragraph representative of the distance, such as a frequency increasing with increasing distance for example, so that a vehicle approaching the control point would progressively reduce the frequency difference at a rate characteristic of the speed of approach, and a device responsive to such rate of change of frequency in the desired range to indicate the speed of the vehicle.

It is another object of the invention to detect vehicles in a traffic lane at a desired distance from a control point by transmitting along the lane a beam of frequency modulated hyper-frequency electro-magnetic waves and beating the transmitted waves against waves reflected from the vehicles to obtain differential waves, with the range of frequency modulation and cyclic rate of such modulation great enough for such differential waves to have a frequency in the audible or lower super-sonic range, and by detecting the differential frequency wave characteristic of the desired vehicle distance by selective frequency filtering circuits tuned to a relatively narrow range of such audible or supersonic frequency corresponding to such characteristic differential frequency wave.

An embodiment of the invention will now be described with reference to the several figures of drawings as follows.

Figure 1:
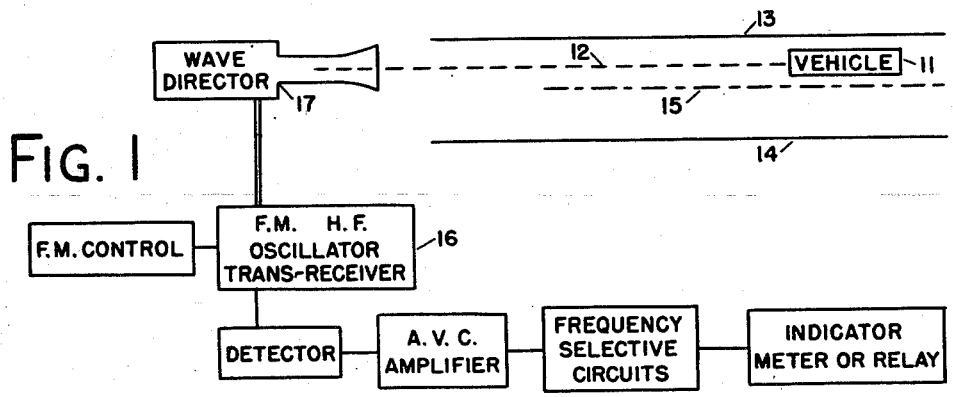
Fig. 1 shows schematically a wave director unit for hyper-frequency radio waves directed along a traffic lane toward an approaching vehicle with a block diagram of the other major elements of a frequency-modulated hyper-frequency vehicle detecting apparatus.

Referring now to Fig. 1, a vehicle 11 is illustrated traveling along a traffic lane 12 toward the left. This vehicle may be an automobile or other ordinary traffic element moving along a road or highway, and it will be assumed it is traveling along a lane or pathway near or approaching a control point from which it is desired to detect the presence of the vehicle.

The lane for convenience is identified at one side of a roadway or other traffic path for two way traffic for example. The two edges of the roadway are shown by the lines 13 and 14 and the center line 15 of the roadway is shown as a broken line and it is assumed for example that the traffic lane in which it is desired to detect vehicles is between the edge 13 and the center line 15.

The vehicle may be detected for purpose of traffic control at an intersection of traffic lanes or for indicating or signaling the speed of the vehicle or for making a count or record of the number of vehicles passing within a time period.

In general in accordance with the invention it is desired to detect a vehicle at some distance, or within some length of the traffic lane, which may be called a zone. In the case of street or highway traffic it may be desired in some cases to detect vehicles approaching at a distance of 500 feet from a traffic intersection, or over a zone extending from 500 to 550 feet from the intersection. In other cases it may be desired to detect vehicles approaching at about 100 feet from the intersection. In many cases it would be most desirable to detect vehicles approaching substantially throughout a zone extending up to 150 feet from the intersection, and the zone may start at a distance of 30 feet from the middle of the intersection in some cases.

At or near the intersection or other control point a transmitter and receiver unit 16 is located for generating and receiving hyper-frequency electro-magnetic or radio waves of the order of 2,000 to 15,000 megacycles. A director 17 for these waves is arranged to direct the waves along the traffic lane in a relatively narrow beam toward the approaching vehicle 11. The waves may be continuous or rapidly intermittent and will be directed along the lane in which it is desired to detect traffic.

In the schematic view of Fig. 1 the transmitter-receiver unit is shown over the traffic lane but it will be understood that this unit may be located at one side of the traffic lane with the transmitter unit separated from the receiver unit if desired. In the present embodiment, however, it is preferred to have a combined unit supported on a pole at the edge of the traffic lane or on a mast-arm extending over the traffic lane.

The hyper-frequency oscillator and detector and miniature antenna may be located in a housing on or integral with a pole and the hyper-frequency waves transmitted and directed by means of a wave-guide up the pole and pointed along the traffic lane, or the oscillator-detector and the wave-guide director may be closely coupled and placed in one unit on the pole or supported over the traffic lane.

The hyper-frequency waves are directed along the traffic lane from the wave director in a substantially straight line on a narrow beam. The waves are reflected to a considerable extent from a vehicle in the line of direction of the waves and a portion of deflected waves is received back at the wave director.

Considering briefly at first the block diagram of the apparatus in Fig. 1, hyper-frequency electric wave energy is generated in the oscillator designated "F. M. H. F. oscillator trans.-receiver." The basic hyper-frequency waves are frequency-modulated by the "F. M. control," and the frequency modulated waves are transmitted to the "wave director" over coaxial cable or a wave guide. In the present instance it will be assumed that the F. M. waves are transmitted as electric currents over a coaxial cable into the "wave director" where a miniature antenna transmits the electric current energy as hyper-frequency electro-magnetic waves. These waves are directed by a wave-guide and horn-shaped device to the right in the figure along the traffic lane.

Waves reflected back from a vehicle travel to the left in the figure and a part of the reflected wave energy passes into the horn device and wave-guide to be picked up by the antenna and transmitted as electric currents to the "F. M. H. F. oscillator-transmitter-receiver."

The outgoing wave currents here are modulated by the reflected wave currents so as to provide a combined or resultant wave pattern containing a differential wave current having a frequency dependent on the difference in time required for a wave to travel out as an outgoing wave to the vehicle and back as a reflected wave. Assuming that the original waves are frequency modulated at a substantially constant rate over the desired range, than the frequency of the differential wave resulting from combination of the outgoing and reflected waves is substantially proportional to the distance of the vehicle from the wave director, providing that the distance of the wave director from the oscillator is negligible in relation to the distance to the vehicle.

The combination of the outgoing and reflected waves is connected to the "detector" where a rectified output is obtained characteristic of the differential frequency. This output is preferably carried through an automatic volume control amplifier designated "A. V. C. amplifier" and thence to an "indicator-meter or relay." The combination of the last two blocks may serve as a frequency meter to show the frequency of the differential wave and may be calibrated in terms of distance if desired.

A limit indicator or relay may be used responsive to a particular frequency or narrow frequency band to indicate the presence of a vehicle at a desired distance or within a desired detection zone over a desired range of distance.

As will be described more fully later herein the "frequency selective circuits" may be set up to identify several successive zones of detection or inspection along the lane of approach, and several corresponding indicators may be employed to show the presence of any vehicle in the inspection zones. Also, as later described herein, selective circuits and corresponding indicators may be used responsive to rate of change of the differential frequency to determine the speed of the vehicle and whether it is approaching the wave director or departing from it.

Figure 2:
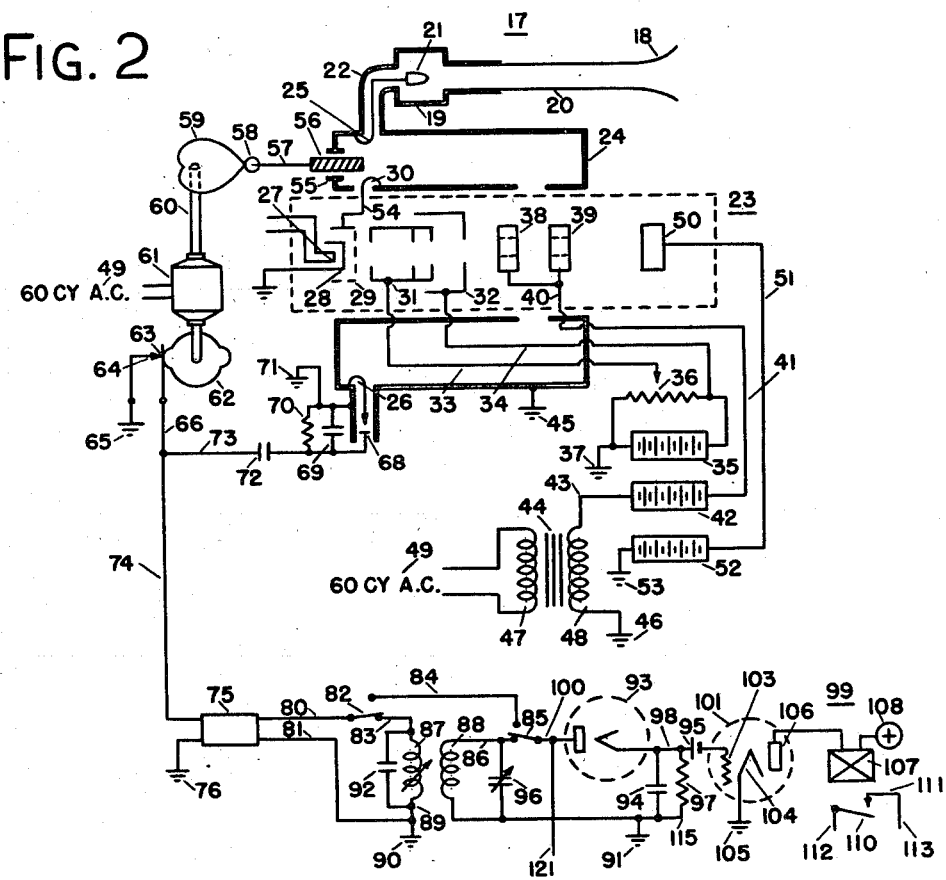
Fig. 2 shows a schematic diagram of equipment and connections for a vehicle detecting apparatus in accordance with the invention.

Considering now Fig. 2 in which applicant's apparatus is illustrated schematically in more detail, the horn 18 or outer end of the wave director 17 is shown connected to the antenna housing 19 by means of a wave guide 20. This wave guide may be very short or insignificant in some cases but in other arrangements at traffic control points or traffic intersections it may be desirable to guide the waves through an angle from the antenna.

The antenna 21 is shown within the antenna housing 19, and is connected by coaxial cable 22 to the oscillator-transmitter-receiver unit shown below. This unit preferably includes a hyper-frequency oscillator tube 23 which is jacketed by a variable frequency cavity resonator 24 shown in schematic section above and below the outline of the tube 23.

The radiator coaxial cable connection 25 to the cavity resonator 24 is shown at the top left of the resonator, and a circuit 26 for taking off the resultant combination output of outgoing and reflected waves is shown at the lower part of the resonator, connecting with a crystal detector 68.

The hyper-frequency oscillator tube includes some familiar form of cathode heater 27 and cathode 28, and control electrode 29, which latter is connected to the cavity resonator by lead 30. The tube 23 also includes the focusing electrodes 31 and 32 connected by wires 33 and 34 respectively to the focus control voltage supply 35 and potentiometer 36. This focusing voltage may be preferably about 500 volts above ground at 37.

The tube further includes the accelerating electrodes 38 and 39 connected via wires 40, 41 to an accelerating voltage supply 42 of about 6000 volts and via wire 43 to a transformer 44 which in turn is connected to 60 cycle A. C. power supply for periodically varying the accelerating voltage. The accelerating voltage supply is shown connected via the secondary 48 of the transformer to ground at 46, with the primary 47 of the transformer connected to 60 cycle power supply 49 as control power.

The oscillator tube 23 also includes the collector electrode 50 connected via wire 51 through a 2000 volt power supply 52 to ground at 53.

The oscillator tube is of the velocity modulated type in which a stream of electrons issuing from the cathode 28 is focused at the electrodes 31, 32, and accelerated at the electrodes 38, 39, and is collected at the electrode 50. The cavity resonator 24 surrounding the tube 23 is so proportioned in relation to the accelerating voltage on electrodes 38 and 39 that the stream of electrons tends to break up into waves of closely spaced electrons and widely spaced electrons along the stream, according to known principles of operation of hyper-frequency oscillator tubes of the Klystron type and the like. The grouping of waves or "bunching" as it is sometimes called induces hyper-frequency currents in the cavity resonator which feed back via wire 54 to the control electrode 29 to cause the tube to oscillate at the desired frequency in the hyper-frequency range and provide output hyper-frequency energy at connection 25 to the antenna 21.

At the left end of the upper part of the cavity resonator 24 in Fig. 2 is shown a sleeved opening at 55, with a plunger 56 which may be moved in and out of the resonator for a small distance to control the resonating frequency of the cavity resonator. It will be understood that the location of this plunger 56 in the resonator as shown in Fig. 2 is for convenience in this schematic drawing and that in actual practice one or more plungers may be employed at a location for most desirable or efficient control of resonator frequency.

In many applications of the invention a sufficiently narrow range of frequency modulation can be chosen which will permit successful operation of the apparatus by frequency modulation through accelerating voltage alone on the oscillating tube 23 without employing a plunger or other mechanical means of changing the resonating characteristic of the cavity resonator in step with the voltage control.

In the present schematic diagram in Fig. 2 the frequency control plunger is connected by a shaft or link 57 to a roller 58 which bears against cam 59. The cam 59 is rotated on shaft 60 by synchronous motor 61 which is connected to the same A. C. power supply 49 for operation in synchronism with the accelerating voltage control.

The cam 59 is adjusted on the shaft and rotates to move the plunger 56 in and out of the resonator 24 to vary the resonant frequency in synchronism and in phase with the corresponding variation of oscillating frequency of the tube 23 caused by controlled variation of the accelerating voltage supplied by transformer 44.

Operation of the cavity frequency control cam and accelerating voltage control in synchronism at a desired time rate is thus employed to raise and lower the output frequency of the tube and resonator periodically, providing frequency modulation of the output hyper-frequency waves.

Preferably the cam 59 is shaped and the accelerating voltage control is arranged to modulate the frequency at a substantially constant time rate as far as possible to obtain as accurate results as possible in determining the distance of the detected vehicle in accordance with the invention. In this connection an interrupter is preferably used to block out the peaks of the frequency modulation curve so that the periodic changes from increasing frequency to decreasing frequency and vice versa in each cycle of the frequency modulation will not confuse the results of detection by distance corresponding to frequency differential.

This interrupter is illustrated schematically in Fig. 2 as a cam 62 on shaft 60, a pair of contacts 63, 64 opened and closed by the cam 62 periodically as the latter rotates in synchronism with the frequency-modulation control. Contact 64 is connected to ground at 65, and contact 63 is connected via wires 66, 73 and capacitor 72 to the rectifier 68, which is preferably of the crystal type.

The lower part of the resonator is shown connected to ground at 45.

The combined outgoing and reflected wave currents are passed through the rectifier 68, and to capacitor 69 and parallel resistor 70 to ground 71 to comprise a detector, and the resultant differential frequency current, representative of the distance of the vehicle and the corresponding travel time between the outgoing and reflected waves, produces a voltage varying at the differential frequency at connection 73, and this varying voltage at the differential frequency is applied via wire 74 to the input of an automatic volume control type amplifier 75, the other side of the input being connected to ground as shown at 76.

It will be noted that the interrupter (or non-linearity limiter as it might be called) periodically connects the input voltage circuit 66 to ground 65 to short-circuit the input to the A. V. C. (automatic volume control) amplifier from the detector and thus limit or eliminate the non-linear parts of the frequency-modulation cycle. The purpose of such operation of the non-linearity limiter is further explained subsequently herein.

The A. V. C. amplifier 75 can be of conventional type, preferably for voltage amplification in a frequency range from 200 to 30,000 cycles for example, with one or more stages of amplification and an output stage. The automatic volume control factor in the amplifier is preferably only partially effective so that the output voltage is not closely controlled but is controlled within a desired operating range and extreme variations will be avoided.

The output of the A. V. C. amplifier is connected to one or more frequency selective circuits as desired. In Fig. 2 the amplifier output at wires 80, 81 is shown connected via switch 82, wire 83 in the lower switch position through the primary coil 87 of a pair of inductively coupled coils 87, 88. The other end 89 of the primary is connected to ground 90. A capacitor 92 is connected across the primary 87. This provides a tuned circuit for selecting the frequency pass of the system corresponding to the desired zone of detection of the system.

The secondary 88 of the inductively coupled coils is connected in series via wire 86, switch 85 (in lower position) to a rectifier 93, and to capacitor 94 with one side of the capacitor and one side of the secondary 88 connected to ground at 91. Tuning capacitor 96 is connected directly across the secondary 88, and a relatively high resistance 97 is connected across the capacitor 94.

The primary 87 of the coupled coils is tuned to the desired frequency selected as representative of the distance at which it is desired to detect a vehicle so that the presence of a vehicle at substantially the detecting distance causes a differential frequency output which is passed by the A. V. C. amplifier and then passed by the tuned coils 87, 88 to provide an output voltage at 98 which can be connected to a sensitive relay or indicating meter 99 through an output power tube 101 as shown.

With switches 82 and 85 in their lower positions as just described the system is set for detection at a predetermined desired distance. If it is desired, however, to detect over the full range of distance corresponding to the pass of the A. V. C. amplifier 75 the switches 82 and 85 will be set in their upper contact positions and a direct connection will be made between the amplifier output at 80, 81 to the rectifier 93 via output wire 80, switch 82, wire 84, switch 85, to rectifier 93.

In Fig. 2 the rectified output of the frequency selective coils is connected at 98 to the control grid 103 of the power tube 101 and the cathode 104 of this tube is connected to ground at 105. The anode 106 of this tube is connected through the coil 107 of the output relay 99 to a power supply 108, the other side of the power supply being connected to ground at 105. The grid 103 is normally biased negatively by cell 95, but presence of a vehicle reduces the bias so as to operate the relay 99. A pair of output contacts 110, 111 with connected output wires 112, 113, are shown schematically, to be operated by change in energization of the coil 107 in response to passage of the characteristic frequency by the frequency selective coil circuit corresponding to presence of a vehicle at the desired detection distance.

The relay 99 and its output contacts 110, 111 serve to indicate presence of a vehicle at the desired detection distance, and the output contacts may be connected to any supplemental audible or visual signal indicator and power supply as desired, or the contacts 110, 111 may be connected to the incoming detection circuit of a traffic actuated traffic signal controller of a number of well-known forms in the prior art.

It will be appreciated that the output tube 101 and relay 99 are shown as illustrative of a preferred form of construction providing sufficient output power to control other signals or indicators or the like but that for some applications of the invention a sensitive indicator may be directly connected across the output of the secondary coil 88, or across the rectified output of this coil at 98, 115.

It will also be understood by those skilled in the art that the capacitor 92 may be made variable instead of or in addition to the variable inductance in the primary coil 87, and also the degree of inductive coupling of the coils 87, 88 can be adjusted by an adjustable spacing to vary the frequency selecting characteristic.

It will also be understood that a range of frequency can be chosen if desired corresponding to a range of distance for detection of a vehicle in a zone along the traffic lane instead of a particular frequency corresponding to a particular distance. For example, a frequency range of 8,000 to 12,000 cycles may be selected as corresponding to a detection distance of 50 to 75 meters or approximately 160 to 240 feet, so that vehicles within this zone starting at about 240 feet from the wave director 17 and continuing to about 160 feet from the director would be detected. In such case the tuned circuits 87, 88 would be arranged for the broader band of frequency 8000 to 12,000 cycles.

The selection of the most desirable band pass filter circuits for particular ranges as desired is a matter of design well known to those skilled in the art, successive stages of filter circuits being employed as desired to sharpen or broaden the frequency limits of any desired band of frequencies characteristic of the particular detection distance or zone.

In one preferred embodiment of the invention the following values may be employed and the operation of the detection apparatus will be more fully understood in a description using these values.

Assume that it is desired to detect vehicles at a distance of about 160 feet from the intersection or control point at which the wave director is located. This distance is about 50 meters in the metric measuring system. Now assuming that the hyper-frequency waves generated by the oscillator tube 23 have a frequency of 10,000 megacycles, these waves act much like light waves and have a speed of the order of 300 million meters per second. Such outgoing waves will travel to any reflecting object such as a vehicle at 50 meters down the lane and 50 meters back, a total distance of 100 meters, in 1/3 of one millionth of a second.

Now using a frequency modulation swing of 200 megacycles total, that is from 9900 megacycles to 10,100 megacycles, varying approximately sinusoidally and at a rate of 60 cycles per second the rise from minimum frequency of 9900 megacycles to maximum of 10,100 megacycles occurs in one 120th of a second or at a rate of change of $200 \times 120 = 24{,}000$ megacycles per second. The reflected wave as received at the wave director will thus be $$\frac{1}{3{,}000{,}000} \times 24{,}000{,}000{,}000 = 8000 \text{ cycles}$$

away from the outgoing wave and the combination of the two waves will create a beat note of 8000 cycles per second at the crystal detector.

This 8000 cycle beat wave is thus characteristic of the distance of 50 meters, and a corresponding calculation for 100 meters will show that a 16,000 cycle beat wave will be obtained with the same assumed modulation. The average ratio of beat wave frequency to distance is thus 160 cycles per meter distance. By arranging the voltage modulation and the synchronized cavity frequency control cam to provide a substantially straight line or triangular type modulation according to procedures well known in the art, the actual ratio of beat wave frequency to distance over the desired range can be maintained quite close to the average ratio, so that 3200 cycles frequency represents 20 meters distance, 4800 cycles represents 30 meters, 8000 cycles represents 50 meters, 16,000 cycles represents 100 meters, etc., and the frequency selective circuits and frequency responsive devices can be made responsive to the desired beat frequency or frequencies to indicate a vehicle or vehicles at one or more detection distances.

In this connection it will be appreciated that in the range of frequency modulation described in the illustrative example the main wave frequency is raised from 990 megacycles to 10,100 megacycles in one 120th of a second and is then lowered from 10,100 megacycles to 9,900 megacycles in the next 120th of a second to provide one complete frequency modulation cycle in one 60th of a second. These changes then repeat in the next cycle in the next 60th of a second. Thus the frequency is rising at a substantially constant rate for one-half the cycle and is falling at a substantially constant rate in the next half cycle after which it repeats these changes.

Any vehicle arriving at the desired detection distance at about the middle of or well within the rising part of the modulation cycle would provide a characteristic beat frequency without difficulty, and correspondingly any vehicle arriving at the same distance well within the falling part of the cycle would provide the same characteristic beat frequency because during the very short time (of the order of 1 millionth of a second to 1 ten-millionth of a second, for example) required for the wave to travel out to the vehicle and back, the frequency change would be substantially the same amount for a given distance whether increasing or decreasing.

However, if the vehicle were to arrive at this detection distance at the time of change from increasing frequency to decreasing frequency in the modulation cycle the net change in frequency between the outgoing and reflected waves would be different from the change in the other two instances just described and thus a false beat frequency would be obtained which would not be characteristic of that distance. It would be possible for a particular wave train to start out a very short time just before the change from increasing to decreasing frequency and for the reflected wave to be received back the same time after the change so that there would be no net change in frequency between outgoing and reflected waves and thus no beat frequency at all for an instant.

Such false and non-representative beat frequencies can be avoided by interrupting operation of the apparatus for a short period overlapping each reversal from increasing to decreasing frequency and vice versa or twice per cycle. This interruption can be introduced at any convenient point in the apparatus and in the present embodiment is provided by the non-linearity limiter cam 62 and contacts 63, 64 which operate to shunt out the output from the crystal detector at 66 twice in each modulation cycle. In this connection capacitor 94 serves to maintain the voltage to the control grid of the output tube 101 and its associated relay circuit during the short interruption periods in each cycle.

It will be appreciated that increasing the length of the interruption periods reduces the portions of the sine wave having the greatest curvature or non-linearity and thus controls the degree of linearity of the frequency-distance relation.

In detecting vehicles in the variable traffic flow normally experienced in a traffic lane it will be appreciated that at times individual vehicles will be spaced apart a considerable distance so that detection at a distance of about 160 feet for example will take place where any one vehicle passes the detection point without any other vehicles within close enough distance ahead or behind to have any determining effect on the selective detection circuits. It will be understood that in the normal flow of traffic at reasonable speeds above 25 miles per hour the spacing between fronts of vehicles will be about three or more times the total length of a vehicle, with the spacing increasing somewhat in general as the vehicle speeds increase, so that vehicles approaching the control point in the normal speed range will be relatively isolated.

It is possible however that vehicles may be in a slowly moving traffic stream or in one that has stopped, as for example, when a line of vehicles is waiting for a traffic signal to change from red to green on a heavily traveled traffic lane, and under such conditions vehicles may be closely spaced with little space between bumpers. However, even with such closely spaced vehicles, whether standing or moving, any vehicle or vehicles at substantially the detection distance will cause a beat frequency characteristic of that distance and the frequency selector circuits will pass such beat frequency to indicate vehicle presence.

It will be appreciated that the beam of hyper-frequency radio waves can be quite narrowly concentrated and the source can be elevated if desired so that the beam will be directed downward at an angle toward the traffic lane so as to strike the traffic lane substantially at the desired detection distance. In the absence of any vehicles at the detection distance the beam will be largely reflected upward again from the roadway or earth and will rise at an angle continuing outward. Such a narrow beam would pass over vehicles appreciably nearer than or beyond the detection distance and would reflect from vehicles in the close vicinity of the particular detection distance.

In case it is desired to detect the presence of a vehicle anywhere along the traffic lane within a distance of 160 feet from director, however, the presence of several vehicles individually in that zone may be disregarded if desired and the hyper-frequency beam directed over a wider vertical angle or more nearly parallel with the road surface and closer to the road surface so that reflection from anyone or more vehicles within this zone will indicate primarily the presence of some traffic in this zone. In such case reflection from any vehicle beyond the 160-foot zone would produce a differential frequency greater than the frequency selector circuit limit and thus would not be detected at the vehicle presence indicator. Any vehicle or vehicles within the maximum 160-foot detection distance would be substantially continuously detected almost to the director.

Figure 3:
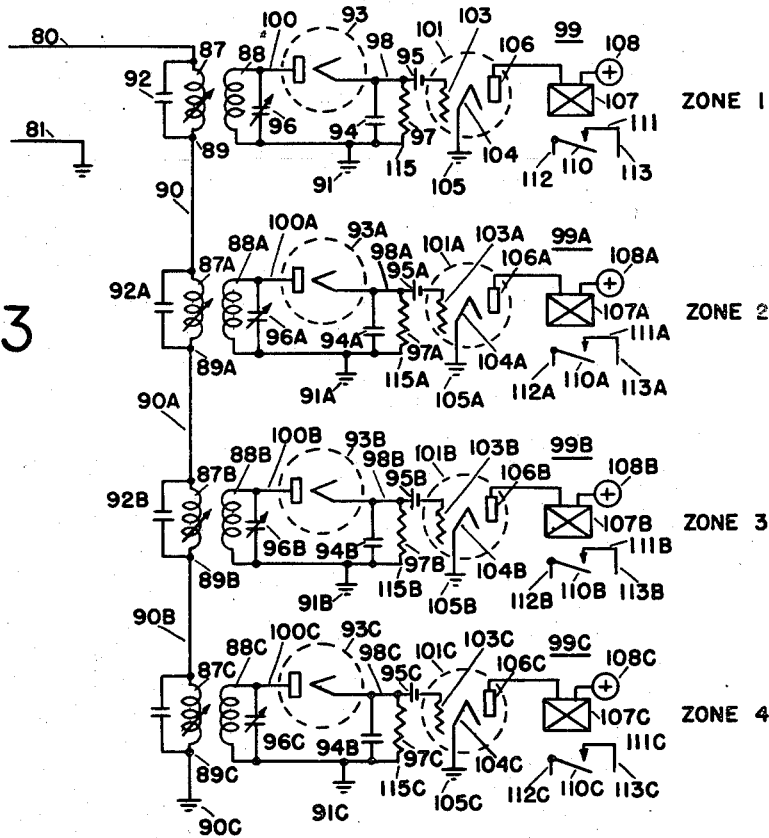
Fig. 3 shows a schematic diagram of associated apparatus for detecting vehicles in successive approach zones.

The tuned frequency selective circuits and presence indicators can be repeated for several detecting zones if desired as shown in Fig. 3, so that separate indications can be obtained of vehicles in the respective zones. Such an arrangement also provides positive indications of the occupation of substantially the entire range of distance from the maximum detection point to a point near the wave director by a plurality of vehicles.

With multiple tuned frequency selector circuits and indicators for successive zones as above outlined the several primary coils 87, 87A, 87B, 87C are connected in series, along with their shunt capacitors 92, 92A, 92B, 92C, and the several secondary coils 88, 88A, 88B, 88C and capacitors 96, 96A, 96B, 96C are connected independently to individual rectifier and output tube and indicator circuits as shown in Fig. 3.

The several zones may each extend over some distance or may extend over a very short distance or be shortened substantially to a succession of detection points as desired by appropriate selection of values for these several inductance coils, and capacitors for the respective zones. For example zone 1 may extend from 50 feet to 100 feet from the wave director 17, zone 2 may extend from 100 feet to 150 feet, zone 3 from 150 feet to 225 feet and zone 4 from 225 feet to 300 feet.

Figure 4:
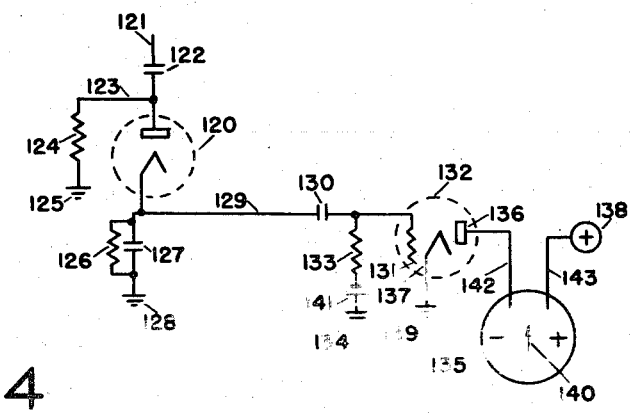
Fig. 4 shows supplementary apparatus for determining the speed and direction of movement of the vehicle within desired limits.

The addition of the apparatus of Fig. 4 to the frequency selective circuit of the presence indicator of Fig. 2 provides for determining the speed of the vehicle in a short detecting zone at the desired distance or for determining the direction of movement of the vehicles as approach or departure along the traffic lane or roadway.

As shown in Fig. 4, a resistance-capacity circuit is connected via wire 121 to wire 100 at the input to the rectifier 93 for the presence indicator of Fig. 2. This connection is made to the coil 88 or to the amplifier output at 80—81 depending on the position of switches 82, 85 as previously described. Wire 121 connects with a capacitor 122 in Fig. 4 and the other side of capacitor 122 is connected via wire 123 through resistance 124 to ground at 125. Another branch circuit including rectifier 120 and capacitor 127 in series is connected between wire 123 and ground 128, with a resistance 126 shunting capacitor 127.

The first capacitor 122 and resistance 124 provide a circuit having a sloping frequency response to the changing differential frequency wave from the vehicle in the detection zone between 125 to 150 meters for example. The differential frequency changes as the vehicle distance changes. As the differential frequency falls with an approaching vehicle for example less current will be drawn through capacitor 122 and resistance 124 and the average voltage value across resistance 124 will fall.

By means of rectifier 120 this falling voltage is applied to wire 129 and capacitor 127 and resistance 126, and also via capacitor 130 to the control grid 131 of vacuum tube 132. A resistance 133 shunts grid 131 to ground at 134 via grid bias cell 141.

If the vehicle is moving at relatively high speed for example the average voltage value applied to capacitor 130 at wire 129 will change relatively rapidly and more of this changing voltage will be applied to the grid 131; whereas if the vehicle speed is relatively low this average voltage value will be changing more slowly and capacitor 130 will offer more impedance to current flow from this voltage and thus a lower voltage value will be impressed on grid 131.

The tube 132 has the usual cathode and anode circuit and a meter 135 may be connected in this circuit between anode 136 and D. C. positive power 138 as shown in Fig. 4 to indicate the speed of the vehicle by the deflection of the meter to the right or left of a zero center position in accordance with the rate of change of the average voltage value amplified by tube 132. The zero center position corresponds to a normal steady current value for no movement of a vehicle in the zone and determined as desired by the grid bias and anode voltage. The direction of the vehicle toward or away from the wave director will be indicated by the deflection of the meter to one side or the other of the center position respectively, showing a decreasing or increasing differential frequency respectively in the vehicle detection circuit. That is, the meter will show a steady deflection to one side of the center position to indicate approach speed, the degree of such steady deflection indicating the speed in miles per hour for example; and the meter will show deflection to the other side of the center position to indicate departure speed with the degree of the steady deflection indicating the rate of speed. The meter will have an initial momentary swing upon entry of a vehicle into the speed detecting zone and another swing upon the vehicle leaving the zone but the steady deflection between these swings will indicate the speed in the zone.

It will be appreciated that the hyper-frequency range employed for the transmitted waves and the frequency modulation limits employed and rate are great enough to bring the differential wave frequency into a range near the upper limits of audible frequencies, preferably since such frequencies can be readily amplified and filtered in frequency selective networks.

It will also be observed that the cyclic rate of frequency modulation provides a considerable number of cycles of modulation while a vehicle is moving through a short detection zone so that no one cycle is the sole determining factor in providing a differential frequency characteristic of the distance to such detection zone.

A modulation rate in the range of the 60 cycle A. C. in the preferred embodiment provides a relatively large number of cycles of swing of the basic hyper-frequency between the modulation limits in relation to the minimum time spacing between vehicles to be expected in ordinary traffic. Such vehicle spacing is normally two seconds or more in a single traffic lane but may fall to one second or less for short periods or momentarily at times, and it will be noted that the 60 cycle modulation provides 120 full swings of the hyper-frequency waves between the modulation limits. The use of a rate of modulation in this range also permits the peaks of the modulated waves to be blanked out by the non-linearity limiter cam device to improve linearity of response without introducing any blank time gap large enough to miss detection of a vehicle moving through a short detection zone at high speed.

It will be noted that the frequency modulation varies the frequency of the hyper-frequency generated wave in approximately straight line relation to time within any half cycle of the modulation and thus the differential frequency in the combination of the originating wave and reflected wave serves as a measure of the time interval between the transmitted and received waves, and of the corresponding distance to the vehicle reflecting the waves.

It will be understood that considerable variation might be made in construction and arrangement in the disclosed embodiment without departing from the spirit of the invention as defined by the claims.

I claim:

1. A system for detecting presence of a vehicle in a vehicular traffic lane in a short detection zone approximating a desired particular predetermined distance from a detecting station including a velocity modulated oscillator tube for generating hyper-frequency electric waves, a modulating device connected to said tube to modulate the frequency of such waves periodically between upper and lower frequency limits at a relatively low rate, an antenna for radiating such waves, a director for directing the radiated waves along the lane from the detecting station so as to have such waves reflected to some extent from a vehicle in the lane and to receive such reflected waves, means connecting the antenna and director and oscillator tube to combine the reflected and originating radiated waves and provide resultant waves of differential frequency substantially proportional to and characteristic of the distance from the detecting station to the vehicle, a detector device for demodulating such resultant waves to obtain the differential frequency as an output, a selective band pass filter for passing only a selected narrow band of such differential frequencies corresponding to a desired range of distance to the vehicle approximating such zone at such particular determined distance, and an output device connected to be operated only by the selected frequency passed to detect presence of a vehicle only at the desired detecting distance.

2. A system for detecting presence of a vehicle in a vehicular traffic lane in a short detection zone approximating a desired particular predetermined distance from a detecting station including a velocity modulated oscillator tube for generating hyper-frequency electric waves, a modulating device connected to said tube to modulate the frequency of such waves periodically between upper and lower frequency limits at a relatively low rate, an antenna for radiating such waves, a director for directing the radiated waves along the lane from the detecting station so as to have such waves reflected to some extent from a vehicle in the lane and to receive such reflected waves, means connecting the antenna and director and oscillator tube to combine the reflected and originating radiated waves and provide resultant waves of differential frequency substantially proportional to and characteristic of the distance from the detecting station to the vehicle, a detector device for demodulating such resultant waves to obtain the differential frequency as an output, a selective band pass filter for passing only a selected narrow band of such differential frequencies corresponding to a desired range of distance to the vehicle approximating such zone at such particular determined distance, and an output device connected to be operated only by the selected frequency passed to detect presence of a vehicle only at the desired detecting distance, said output device including an amplifier tube controlled by said selected frequency and a relay connected to the output of said amplifier tube to be controlled thereby.

3. A system for detecting presence of a vehicle in a vehicular traffic lane in a short detection zone approximating a desired particular predetermined distance from a detecting station including a velocity modulated oscillator tube for generating hyper-frequency electric waves, a modulating device connected to said tube to modulate the frequency of such waves periodically between upper and lower frequency limits at a relatively low rate, an antenna for radiating such waves, a director for directing the radiated waves along the lane from the detecting station so as to have such waves reflected to some extent from a vehicle in the lane and to receive such reflected waves, means connecting the antenna and director and oscillator tube to combine the reflected and originating radiated waves and provide resultant waves of differential frequency substantially proportional to and characteristic of the distance from the detecting station to the vehicle, a detector device for demodulating such resultant waves to obtain the differential frequency as an output, a selective band pass filter for passing only a selected narrow band of such differential frequencies corresponding to a desired range of distance to the vehicle approximating such zone at such particular determined distance, and an output device connected to be operated only by the selected frequency passed to detect presence of a vehicle only at the desired detecting distance, and means for cyclically interrupting the differential frequency waves in synchronism with the frequency modulation of the generated waves at the upper and lower limits of such frequency modulation to improve the linearity of relationship of the differential frequency to such distance to the vehicle.

4. A system for detecting presence of a vehicle in a vehicular traffic lane in a short detection zone approximating a desired particular predetermined distance from a detecting station including a velocity modulated oscillator tube for generating hyper-frequency electric waves, a modulating device connected to said tube to modulate the frequency of such waves periodically between upper and lower frequency limits at a relatively low rate and including means for cyclically varying the accelerating voltage of said velocity modulated oscillator tube, an antenna for radiating such waves, a director for directing the radiated waves along the lane from the detecting station so as to have such waves reflected to some extent from a vehicle in the lane and to receive such reflected waves, means connecting the antenna and director and oscillator tube to combine the reflected and originating radiated waves and provide resultant waves of differential frequency substantially proportional to and characteristic of the distance from the detecting station to the vehicle, a detector device for demodulating such resultant waves to obtain the differential frequency as an output, a selective band pass filter for passing only a selected narrow band of such differential frequencies corresponding to a desired range of distance to the vehicle approximating such zone at such particular determined distance, and an output device connected to be operated only by the selected frequency passed to detect presence of a vehicle only at the desired detecting distance.

5. A system for detecting presence of a vehicle in a vehicular traffic lane in a short detection zone approximating a desired particular predetermined distance from a detecting station including a velocity modulated oscillator tube for generating hyper-frequency electric waves, a modulating device connected to said tube to modulate the frequency of such waves periodically between upper and lower frequency limits at a relatively low rate, said velocity modulated oscillator tube including a cavity resonator, and said modulating device including means for cyclically varying the accelerating voltage of said oscillator tube and means including an oscillating plunger element for cyclically tuning said cavity resonator in synchronism with such variation of accelerating voltage, an antenna for radiating such waves, a director for directing the radiated waves along the lane from the detecting station so as to have such waves reflected to some extent from a vehicle in the lane and to receive such reflected waves, means connecting the antenna and director and oscillator tube to combine the reflected and originating radiated waves and provide resultant waves of differential frequency substantially proportional to and characteristic of the distance from the detecting station to the vehicle, a detector device for demodulating such resultant waves to obtain the differential frequency as an output, a selective band pass filter for passing only a selected narrow band of such differential frequencies corresponding to a desired range of distance to the vehicle approximating such zone at such particular determined distance, and an output device connected to be operated only by the selected frequency passed to detect presence of a vehicle only at the desired detecting distance.

6. A system for detecting the presence of a vehicle along a vehicular traffic lane substantially throughout a predetermined range of distance from a detecting station adjacent said lane, and extending from close to such detecting station to a desired maximum predetermined detection distance, including means for generating and directing frequency-modulated hyper-frequency waves, from said detecting station along said traffic lane and receiving such waves reflected back from a vehicle in the lane and combining the reflected and generated waves to provide differential waves having a frequency representative of the distance from the detecting station to the vehicle, means for demodulating such combined waves to separate the differential frequency wave, a multiplicity of frequency selection circuits for selecting different relatively narrow predetermined frequency bands from said differential frequency waves corresponding to a series of more than two substantially adjacent zones consecutively arranged along said lane within such predetermined maximum distance and means connected to said frequency selective circuits and responsive to the several respective selected frequency bands to represent presence of one or more vehicles substantially throughout said maximum detection distance.

7. A system for detecting the presence of a vehicle along a vehicular traffic lane substantially throughout a predetermined range of distance from a detecting station adjacent said lane, and extending from close to such detecting station to a desired maximum predetermined detection distance, including means for generating and directing frequency-modulated hyper-frequency waves, from said detecting station along said traffic lane and receiving such waves reflected back from a vehicle in the lane and combining the reflected and generated waves to provide differential waves having a frequency representative of the distance from the detecting station to the vehicle, means for demodulating such combined waves to separate the differential frequency wave, a multiplicity of frequency selection circuits for selecting different relatively narrow predetermined frequency bands from said differential frequency waves corresponding to a series of more than two substantially adjacent zones consecutively arranged along said lane within such predetermined maximum distance and means connected to said frequency selective circuits and responsive to the several respective selected frequency bands to represent presence of one or more vehicles substantially throughout said maximum detection distance, said means responsive to the several respective selected frequency bands including amplifier tubes connected to the respective frequency selective circuits to be individually controlled by the respective frequency bands of such differential frequency waves, and relays connected to the respective amplifier tubes to be individually controlled by the output thereof, whereby the presence of vehicular traffic in the respective zones will be indicated by operation of the respective relays.

8. A system for detecting presence of vehicles along a traffic lane over a predetermined range of distance from a detecting station adjacent said lane as indicating the degree of occupancy of such range of distance by vehicular traffic, including means for generating and directing frequency modulated hyper-frequency waves from said detecting station along said traffic lane and receiving such waves reflected back from a vehicle in the lane and combining the reflected and generated waves to provide differential waves having a frequency representative of the distance from the detecting station to the vehicle, means for demodulating such combined waves to separate the differential frequency wave, a multiplicity of frequency selection circuits for selecting different frequency bands from said differential frequency waves corresponding to a series of more than two zones substantially adjacent consecutively along said lane within such range of distance, and means connected to said frequency selection circuits and responsive to such separated differential waves in the respective selected frequency bands to indicate the degree of occupancy of such range of distance by the number of such bands in which such differential waves for vehicles appear in the several zones at any one time.

9. A system for detecting the presence of vehicles in a traffic approach lane in a two way traffic roadway at a particular substantially predetermined distance from a detecting station adjacent said roadway including means for generating frequency modulated hyper-frequency waves, means directing such waves from said detecting station in a relatively narrow beam along such approach lane so as to be reflected toward said detecting station principally from a vehicle in said approach lane as contrasted with vehicles outside such approach lane, means for combining such reflected waves with such generated waves at said detecting station to provide differential waves having a differential frequency substantially proportional to and representative of the distance from said detecting station to said vehicle, means for demodulating such combined waves to separate the differential frequency waves, frequency selective circuit means having a relatively sharp peak response to the differential frequency from said demodulating means corresponding with such particular substantially predetermined distance, and output means operated only by said peak response to indicate presence of a vehicle in said approach lane only at such particular substantially predetermined distance.

10. A system for detecting the presence of vehicles in a traffic approach lane in a two way traffic roadway at a particular substantially predetermined distance from a detecting station adjacent said roadway including means for generating frequency modulated hyper-frequency waves, means directing such waves from said detecting station in a relatively narrow beam along such approach lane so as to be reflected toward said detecting station principally from a vehicle in said approach lane as contrasted with vehicles outside such approach lane, means for combining such reflected waves with such generated waves at said detecting station to provide differential waves having a differential frequency substantially proportional to and representative of the distance from said detecting station to said vehicle, means for demodulating such combined waves to separate the differential frequency waves, frequency selective circuit means having a relatively sharp peak response to the differential frequency from said demodulating means corresponding with such particular substantially predetermined distance and including a tuned coil and capacitor combination across the output of said demodulating means and another coil and capacitor combination coupled to the first, and output means operated only by said peak response to indicate presence of a vehicle in said approach lane only at such particular substantially predetermined distance and including an amplifier tube controlled by the output of said coil and capacitor combinations, and a relay connected to the output of said amplifier tube to be controlled thereby.

11. A system for detecting the presence of vehicles in a traffic approach lane in a two way traffic roadway at a particular substantially predetermined distance from a detecting station adjacent said roadway including means for generating frequency modulated hyper-frequency waves, means directing such waves from said detecting station in a relatively narrow beam along such approach lane so as to be reflected toward said detecting station principally from a vehicle in said approach lane as contrasted with vehicles outside such approach lane, means for combining such reflected waves with such generated waves at said detecting station to provide differential waves having a differential frequency substantially proportional to and representative of the distance from said detecting station to said vehicle, means for demodulating such combined waves to separate the differential frequency waves, frequency selective circuit means having a relatively sharp peak response to the differential frequency from said demodulating means corresponding with such particular substantially predetermined distance, and output means operated only by said peak response to indicate presence of a vehicle in said approach lane only at such particular substantially predetermined distance, said output means including a detector tube circuit for converting such peak response differential frequency to a direct current value proportional to said frequency, an amplifier tube having its input controlled by the output of said detector tube circuit, and a relay connected to the output circuit of said amplifier tube to be controlled thereby.

12. A system for detecting presence of vehicle traffic approaching a detection station within a relatively short zone approximating a particular substantially predetermined distance from such station, including in combination a roadway adjacent said station for such vehicle traffic and having lanes for approach and departure in opposite directions along said roadway with respect to said detection station, means for generating frequency modulated hyper-frequency waves, means directing such waves in a relatively narrow beam from said detection station along said approach lane so that such waves will be reflected principally from a vehicle in said approach lane as contrasted with vehicles in said departure lane, means for combining such reflected waves with such generated waves at said detecting station to provide differential waves having a differential frequency substantially proportional to and representative of the distance from said detecting station to said vehicle, means for demodulating such combined waves to separate the differential frequency waves, frequency selective circuit means responsive substantially only to a narrow band of differential frequencies from said demodulating means approximating a predetermined differential frequency corresponding with such particular substantially predetermined distance, and output relay means operated only by said response of said frequency selective means to indicate presence of vehicle in said approach lane only within such zone approximating such particular substantially predetermined distance.

JOHN L. BARKER.

REFERENCES CITED

The following references are of record in the file of this patent:

UNITED STATES PATENTS

| Number | Name | Date |
|---|---|---|
| Re. 21,955 | Chaffee | Nov. 25, 1941 |
| 2,045,071 | Espenschied | June 23, 1936 |
| 2,086,742 | Scharlau | July 13, 1937 |
| 2,256,539 | Alford | Sept. 23, 1941 |
| 2,301,929 | Budenbom | Nov. 17, 1941 |
| 2,268,587 | Guanella | Jan. 6, 1942 |
| 2,402,464 | Suter | June 18, 1946 |
| 2,409,448 | Rost | Oct. 15, 1946 |
| 2,412,632 | Sanders | Dec. 17, 1946 |
| 2,420,264 | Rost | May 6, 1947 |

FOREIGN PATENTS

| Number | Country | Date |
|---|---|---|
| 113,233 | Australia | June 2, 1941 |